United States Patent [19]

Stenzel et al.

[11] Patent Number: 4,650,319

[45] Date of Patent: Mar. 17, 1987

[54] EXAMINING METHOD FOR THE WEAR-CONDITION OF DATA CARRIERS

[75] Inventors: Gerhard Stenzel, Munich; Wittich Kaule, Gauting, both of Fed. Rep. of Germany

[73] Assignee: Gao Gesellschaft für Automation und Organisation mbH, Fed. Rep. of Germany

[21] Appl. No.: 786,154

[22] Filed: Oct. 8, 1985

Related U.S. Application Data

[63] Continuation of Ser. No. 175,763, Aug. 6, 1980, abandoned.

[30] Foreign Application Priority Data

Aug. 14, 1979 [DE] Fed. Rep. of Germany ....... 2932962

[51] Int. Cl.$^4$ ............ G01N 21/17

[52] U.S. Cl. ............ 356/51; 356/71

[58] Field of Search ............ 350/51, 71, 239; 250/338 R, 556

[56] References Cited

U.S. PATENT DOCUMENTS

| | | | |
|---|---|---|---|
| 2,731,621 | 1/1956 | Sontheimer | 356/71 |
| 3,491,243 | 1/1970 | Tsugami | 356/71 |
| 3,496,371 | 2/1970 | Endo | 356/71 |
| 3,759,382 | 9/1973 | Walkley et al. | 209/111.7 |
| 3,916,194 | 10/1975 | Novak et al. | 250/556 |
| 3,922,557 | 11/1975 | Carnes, Jr. | 209/534 |
| 3,976,198 | 8/1976 | Carnes, Jr. et al. | 209/111.7 T |
| 4,147,430 | 4/1979 | Gorgone et al. | 356/51 |
| 4,184,081 | 1/1980 | Bergamini | 250/556 |
| 4,189,235 | 2/1980 | Guter et al. | 356/239 |

FOREIGN PATENT DOCUMENTS

| | | | |
|---|---|---|---|
| 2310882 | 3/1973 | Fed. Rep. of Germany . | |
| 2440550 | 1/1976 | Fed. Rep. of Germany . | |
| 2752412 | 1/1978 | Fed. Rep. of Germany | 356/71 |
| 52-11992 | 1/1977 | Japan | 356/71 |
| 1532019 | 11/1978 | United Kingdom . | |

*Primary Examiner*—William H. Punter
*Attorney, Agent, or Firm*—Andrus, Sceales, Starke & Sawall

[57] ABSTRACT

A method for examining the degree of wear of banknotes containing printing translucent with respect to light in the invisible spectral range. The method comprises irradiating the bank note with light containing portions of the invisible spectral range, such as infrared light; collecting the reflected portion of the applied light; and evaluating same for determining the wear condition of the banknote.

3 Claims, 2 Drawing Figures

EXAMINING METHOD FOR THE WEAR-CONDITION OF DATA CARRIERS

This application is a continuation of application Ser. No. 175763, filed Aug. 6, 1980, and now abandoned.

BACKGROUND OF THE INVENTION

1. Field of the Invention

This invention concerns a method for testing the degree of wear of banknotes which are at least partially printed with printing inks which are translucent in respect of light in the invisible range of the spectrum.

2. Description of the Prior Art

The determination of the degree of wear of banknotes is known from numerous publications. In these known methods, unprinted portions of a banknote, such as for example the margin of the note (German OS-print 2,310,882) or unprinted portions contained within the surface of a banknote (U.S. Pat. No. 2,950,799), are generally used for this purpose. If the banknote in question has no unprinted portions or if such unprinted portions are not sufficiently large, testing must be carried out within the print format of the note. It must be taken into account that, as compared with the examination of unprinted sections of a note, the light reaching the photodiodes is modulated by the print pattern along the scanning track. In this connection a testing process is mentioned in German OS-print 2,752,412 which proceeds from the concept that an unsoiled banknote has a certain number of contrast jumps of a certain height along a track running through printed sections of a note which corresponds to the existing print pattern. These contrast jumps produce a standard signal when added up as signal values along the track. If a banknote is soiled the contrast is diminished so that the testing level added up in the case of such a note will deviate from the standard level of a clean note to a greater or lesser degree, depending on how soiled the note is. The difference between both of these levels can be taken as a measure for the degree of soiling.

The method produces good results as long as the track used for the formation of the standard signal is exactly followed in subsequent tests. Now if one diverges from the track, and this is more or less inevitable, the photodiode will scan a more or less varied printed pattern in the vicinity of the original track, and this will inevitably lead to changes in the testing level independent of how soiled the banknote in question is. Depending on the amount of divergency, the testing level will therefore be within a scattering range when a multiple of equally soiled banknotes are scanned or when the same note is scanned a number of times, and this excludes the possibility of obtaining a rating of the degree of wear of a note which is within fine tolerances and subdivided into a number of comparison stages.

SUMMARY OF THE PRESENT INVENTION

It is therefore the object of the invention to provide a method and a means for examining the state of wear or condition of banknotes in which the test results obtained in the case of equally soiled or worn notes will, within extensive limits and independent of track divergence, be within a narrow scattering range, even when the printed portions of a note are examined.

This object is solved in accordance with the invention by irradiating a data carrier with light containing portions of the invisible range of the spectrum, by collecting the remitted portion of this light along one or more measuring tracks and by evaluating the measured signal produced.

Several printing techniques are used when designing securities and banknotes for the purpose of reducing their succeptibility to forgery and counterfeiting. Thus one will find parts of banknotes which are printed with the very complicated and costly steel-photogravure technique, while other surface areas are printed with the lithoprinting technique, for example for printing background patterns.

When examining banknotes it was found that many of the inks used are permeable in respect of infrared light. Moreover it was found that soiled or worn areas have the same wear indicating characteristics when irradiated with infrared light as when irradiated with visible light.

If a banknote is irradiated with light, which includes parts of the infrared portion of the spectrum, in the portions printed with ink which is translucent in respect of infrared light, and if only the infrared portions of the remitted light reaching the photodiode are filtered, the signals received will be essentially free from the modulation normally produced by the print pattern in visible light. If the measuring tracks are skillfully selected, the testing level can be contained within a narrow scattering range when divergency from the track occurs, this being also true when such divergency occurs with the same amount of wear of soiling but with different print patterns, as may often be the case. Since the print pattern is eliminated, the testing track may also lead from the unprinted area of a banknote into the printed area, and this means that a high degree of flexibility in respect of the selection of the testing tracks of different banknotes is possible.

Testing within the invisible range of the spectrum is not exclusively limited to the infrared range. Printing inks which are translucent in other ranges of the invisible spectrum may naturally also be used for the purpose of examination and are within the scope of the invention.

BRIEF DESCRIPTION OF THE DRAWING

The invention will now be described in more detail by way of an embodiment example and with reference to the drawing, in which.

DETAILED DESCRIPTION OF THE PREFERRED EMBODIMENT

Figure 1:
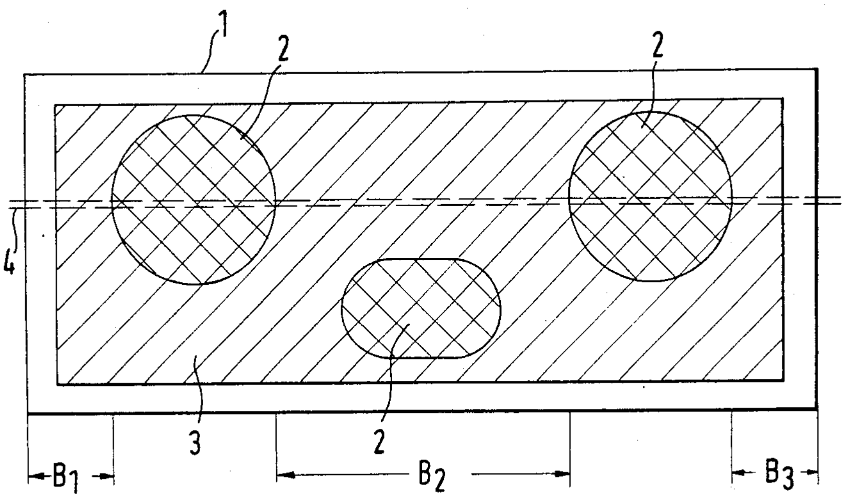
FIG. 1 shows the schematised division of the surface of a banknote into print areas which are permeable and impermeable in respect of infrared light.

FIG. 1 shows a banknote 1 with a printed pattern arranged such that a narrow margin remains unprinted. It is assumed that the cross-hatched areas 2 within the print pattern, which are randomly selected in this example, are printed with inks which are not translucent in respect of infrared light. A print pattern with printing inks which are translucent in respect of infrared light is situated in the remaining surface areas 3 (illustrated with slanted shading). A randomly selected testing track 4 runs through printed portions of the note which are alternately printed with inks which are translucent and not translucent, respectively, in respect of infrared light. In accordance with the invention the areas marked $B_1$, $B_2$ and $B_3$ are essentially suitable for examining the degree of wear or soiling. It is, however, sufficient to use only one of these areas, e.g. $B_2$, for the purpose of carrying out the test.

The examination is, however, also possible along the other areas $B_1$ and $B_3$ although the testing track partly runs through the completely unprinted portion of the banknote. Even if the testing means sometimes fails to scan a preset testing track exactly, due for instance to mechanical shortcomings of the instrument, the scattering of the measured results can nevertheless be contained within a narrow degree of tolerance because the influence of the print pattern, which may vary extensively from portion to portion, is eliminated and is generally evenly distributed in the soiled portions within large surface areas.

Figure 2:
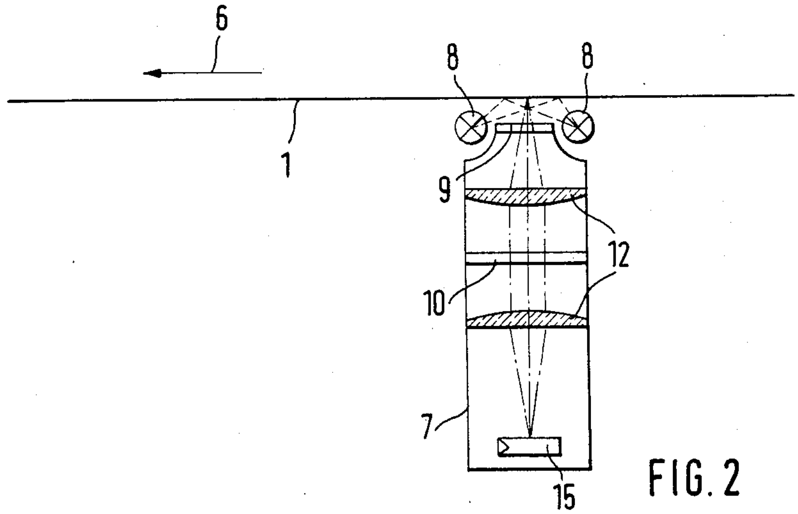
FIG. 2 shows the simplest embodiment of a means for testing banknotes in accordance with FIG. 1.

FIG. 2 shows an example of a testing means which can be used in the practical application of the inventive method.

The banknote 1 running in the direction of the arrow 6 past the testing means 7 is irradiated with light in the region of the testing track by means of two tungsten lamps 8. Apart from the visible range of the spectrum the irradiated light also contains a large amount of infrared light. The light remitted by the banknote under examination passes through a stop 9 on to a lens arrangement 12. A filter 10 is disposed in the path of the rays of the optical system. This filter permits only the infrared portion of the remitted light to be transmitted to a photodiode 15 which in the known manner converts the illumination variations caused by soiled or worn areas of a note into corresponding signals which can be evaluated electronically. The measured signal, which is modulated dependent on the amount of soiling, is added up along the scanned portion, and the sum values are compared with a desired value after the measuring track has run through.

FIG. 2 shows the possibility for decoupling the amount of infrared light on the receiving side only. It is naturally also possible, depending on the particular application in question, to irradiate the testing area with infrared light only, using ordinary commercial infrared light-emitting diodes. In so doing the filter may be retained in order to compensate the influence of extraneous light.

What we claim is:

1. A method for indicating the visually ascertainable degree of soiling or wear of data carriers printed at least partially with inks that are translucent for light in the infrared range of the electromagnetic spectrum said method comprising the steps of:

selecting a linear path across the data carrier containing at least one portion printed with inks translucent to infrared light, said portion or portions having a length sufficient for accurate, reliable soiling or wear detection purposes;

etablishing a point of irradiation having infrared light;

moving the data carrier past the point of irradiation so that the linear path across the data carrier is irradiated with infrared light;

obtaining a signal indicative of the remitted part of the infrared light at least from the portion or portions of said path printed with inks translucent to infrared light; and evaluating variations in the signal obtained from the remitted part of the infrared light from the portion or portions of said path printed with inks translucent to infrared light as an indication of the degree of the soiling or wear of the data carrier.

2. A method according to claim 1 wherein the data carrier contains printed and unprinted portions and wherein the step of selecting the linear path is further defined as selecting a linear path containing printed and unprinted portions; and wherein the step of moving the data carrier is further defined as moving the data carrier past the point of irradiation so that the linear path containing printed and unprinted portions is irradiated with infrared light.

3. The method according to claim 1 wherein the signal evaluating step is further defined as adding up the signals obtained from said portion or portions of said linear path printed with inks translucent to infrared light and comparing the signal so obtained with a desired value as an indication of the degree of wear or soiling of the data carrier.

* * * * *